US011921588B2

United States Patent
Sinha et al.

(10) Patent No.: US 11,921,588 B2
(45) Date of Patent: *Mar. 5, 2024

(54) SYSTEM AND METHOD FOR DATA PROTECTION DURING POWER LOSS OF A STORAGE SYSTEM

(71) Applicant: DELL PRODUCTS, LP, Round Rock, TX (US)

(72) Inventors: Prasoon Kumar Sinha, Bangalore (IN); Karthik Sethuramalingam, Bangalore (IN); Suman Lal Banik, Bangalore (IN); Ravishankar Kanakapura N, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,477

(22) Filed: Dec. 1, 2021

(65) Prior Publication Data

US 2022/0091941 A1 Mar. 24, 2022

Related U.S. Application Data

(63) Continuation of application No. 17/006,250, filed on Aug. 28, 2020, now Pat. No. 11,237,917.

(51) Int. Cl.
*G06F 11/00* (2006.01)
*G06F 1/28* (2006.01)
(Continued)

(52) U.S. Cl.
CPC ............ *G06F 11/1458* (2013.01); *G06F 1/28* (2013.01); *G06F 1/30* (2013.01); *G06F 11/1469* (2013.01);
(Continued)

(58) Field of Classification Search
CPC ........ G06F 1/28; G06F 1/30; G06F 2201/805; G06F 11/1458; G06F 11/1461
See application file for complete search history.

(56) References Cited

U.S. PATENT DOCUMENTS

| 8,631,198 B2 | 1/2014 | Ng |
| 8,762,643 B2 | 6/2014 | Ishii |

(Continued)

*Primary Examiner* — Marc Duncan
(74) *Attorney, Agent, or Firm* — Larson Newman, LLP

(57) ABSTRACT

A method includes obtaining data associated with a volatile storage device and a non-volatile storage device of an information handling system during a normal mode of operation of the information handling system, and calculating a first data transfer frequency and a first transfer data size from the volatile storage device to the non-volatile storage device based on the data associated with the volatile storage device and the non-volatile storage device during the normal mode of operation of the information handling system. The method also includes detecting an event indicating a power outage of the information handling system, and in response to the detecting the event, determining a data management policy to be applied to the information handling system during the safe mode of operation of the information handling system. The method also includes calculating a second data transfer frequency and a second transfer data size from the volatile storage device to the non-volatile storage device based the data management policy, and updating a first setting and a second setting in a data management system that enforces the data management policy.

20 Claims, 4 Drawing Sheets

(51) Int. Cl.
*G06F 1/30* (2006.01)
*G06F 11/14* (2006.01)

(52) U.S. Cl.
CPC .................. *G06F 2201/805* (2013.01); *G06F 2212/1032* (2013.01)

(56) References Cited

U.S. PATENT DOCUMENTS

| | | |
|---|---|---|
| 9,891,846 B2 | 2/2018 | Hsu et al. |
| 11,237,917 B1 * | 2/2022 | Sinha .................. G06F 11/1469 |
| 2011/0191535 A1 | 8/2011 | Yuasa |
| 2015/0317248 A1 | 11/2015 | Lamb |
| 2018/0011524 A1 | 1/2018 | Stumpf et al. |
| 2018/0032265 A1 | 2/2018 | Kotzur |
| 2018/0032390 A1 | 2/2018 | Rahmanian et al. |
| 2018/0032439 A1 | 2/2018 | Jenne et al. |
| 2019/0205042 A1 | 7/2019 | Kandula |
| 2020/0379645 A1 | 12/2020 | Kazi et al. |

* cited by examiner

SYSTEM AND METHOD FOR DATA PROTECTION DURING POWER LOSS OF A STORAGE SYSTEM

CROSS-REFERENCE TO RELATED APPLICATION

This application is a Continuation of U.S. patent application Ser. No. 17/006,250 entitled "SYSTEM AND METHOD FOR DATA PROTECTION DURING POWER LOSS OF A STORAGE SYSTEM" filed on Aug. 28, 2020, the disclosure of which is hereby expressly incorporated by reference in its entirety.

FIELD OF THE DISCLOSURE

The present disclosure generally relates to information handling systems, and more particularly relates to data loss protection during power loss of a storage system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A method includes obtaining data associated with a volatile storage device and a non-volatile storage device of an information handling system during a normal mode of operation of the information handling system, and calculating a first data transfer frequency and a first transfer data size from the volatile storage device to the non-volatile storage device based on the data associated with the volatile storage device and the non-volatile storage device during the normal mode of operation of the information handling system. The method also includes detecting an event indicating a power outage of the information handling system, and in response to the detecting the event, determining a data management policy to be applied to the information handling system during the safe mode of operation of the information handling system. The method also includes calculating a second data transfer frequency and a second transfer data size from the volatile storage device to the non-volatile storage device based the data management policy, and updating a first setting and a second setting in a data management system that enforces the data management policy.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
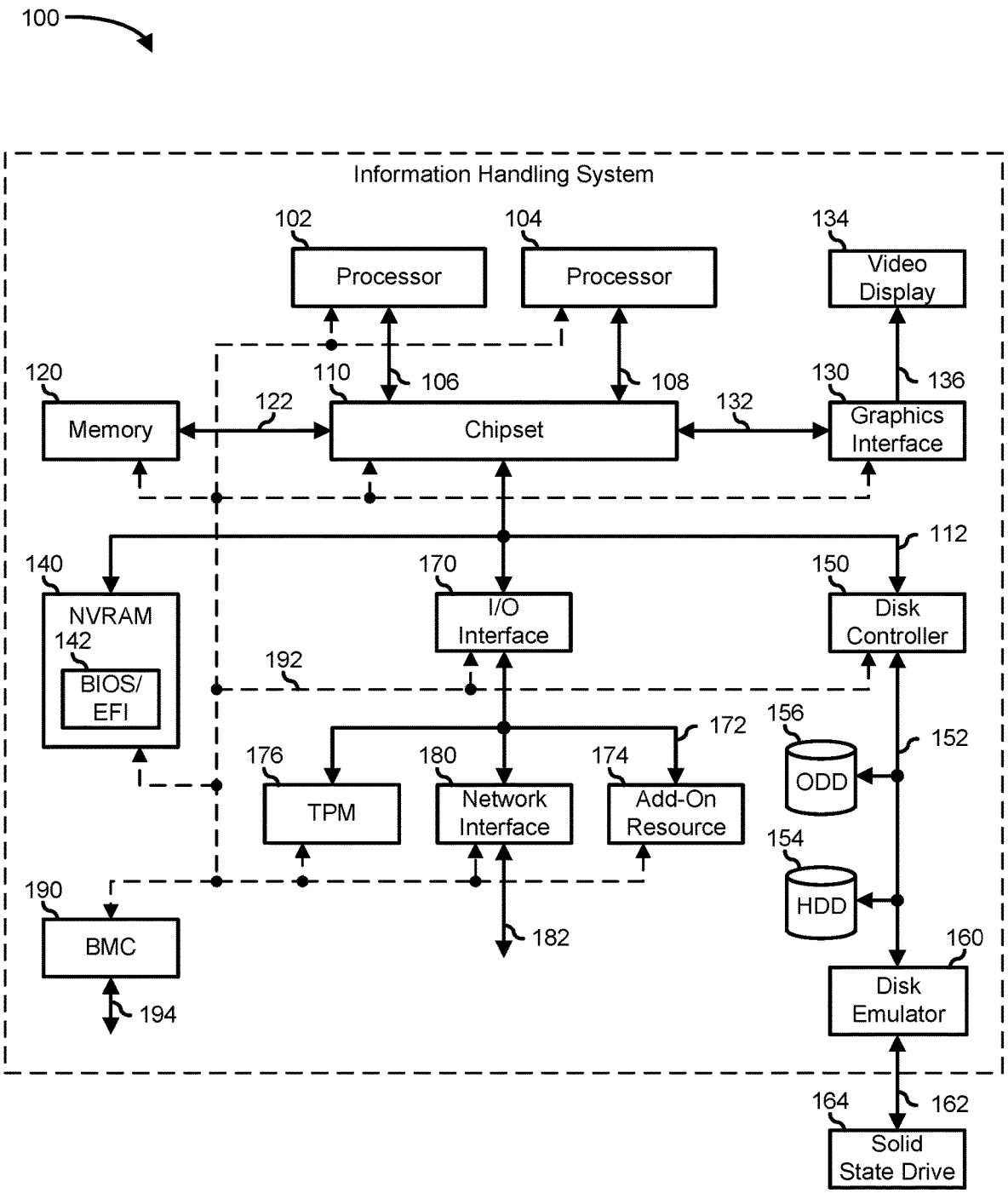
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a $Redfish$® interface), various vendor-defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after the power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Datacenters are generally protected with a backup power source such as an engine-generator and an emergency power supply such as an uninterruptible power supply (UPS). During unforeseen outages of the active power source, the backup power source typically takes some time before it can take over and supply power to one or more servers in the datacenter. At this time, the UPS provides power to the datacenter. However, the UPS can only supply power for a limited time. If the backup power source fails to take over before the UPS battery runs out, then the one or more servers may abruptly shut down, leading to data loss. The current system and method may mitigate the data loss by optimizing the size of data in a volatile memory device and frequency of data movement from the volatile memory device to a persistent storage device while considering the health and availability of the UPS.

Figure 2:
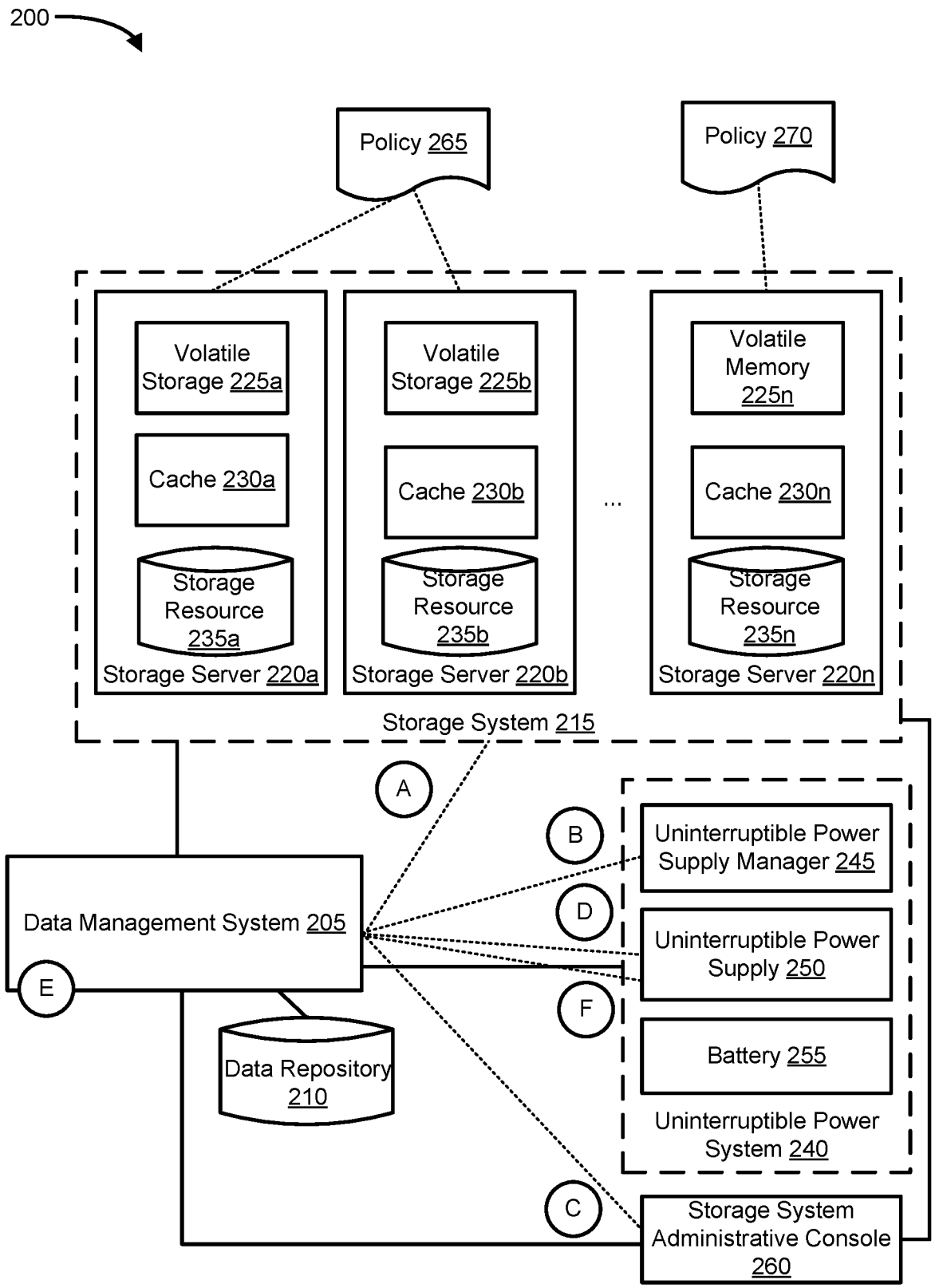
FIG. 2 is a block diagram illustrating an example of a system for data loss protection during power loss of a storage system, according to an embodiment of the present disclosure.

FIG. 2 illustrates an example of environment 200 where systems and methods for data loss protection during power loss of a storage system may be implemented. Environment 200 includes a storage system 215, a data management system 205, a data repository 210, an uninterruptible power system 240, and a storage system administrative console 260. Data management system 205 is communicatively coupled to data repository 210, storage system administrative console 260, uninterruptible power system 240, and storage system 215. Uninterruptible power system 240 includes a UPS manager 245, a UPS 250, and a battery 255. Storage system 215 includes one or more storage servers such as a storage server 220a, storage server 220b through storage server 220n. Each one of the storage servers may be similar to information handling system 100 of FIG. 1 and includes a volatile storage device and at least one non-volatile storage device. Accordingly, storage server 220a includes a volatile storage 225a, a cache 230a, and a storage resource 235a. Similarly, storage server 220b includes a volatile storage 225b, a cache 230b, and a storage resource 235b. Also, storage server 220n includes a volatile storage 225n, a cache 230n, and a storage resource 235n.

Storage system 215 may be a software-defined storage solution such as VMware vSAN™ and Storage Spaces Direct™ (S2D) by Microsoft®. A software-defined storage environment is a storage architecture wherein the logical storage resources and services are separated from physical storage systems. Each storage server may implement tiered caching wherein data the storage server has a volatile memory layer, a cache layer, and a persistent data storage layer. Data also referred to as workload is written first to volatile memory then moved to the cache before writing to a persistent storage resource periodically. For example, in storage server 220a, data is first written in volatile storage 225a, then to cache 230a before writing the data to storage resource 235a. The size of the data kept in the volatile memory and the frequency of data transfer to the cache may be based on various parameters. Similar parameters may be used to determine the size of the data maintained in the cache and the frequency of data transfer from the cache to the storage resource. The parameters may include the size of the memory and/or cache, the capacity of the UPS, UPS runtime, battery charge level, etc.

The volatile storage such as volatile storage 225a through volatile storage 225n may be a DIMM, a DRAM, a RAM, or other volatile memory that may be used as temporary data storage. The non-volatile storage such as cache 230a through cache 230n may be a non-volatile storage such as an SSD, a flash memory, a non-volatile dual in-line memory module (NVDIMM), or a magnetic storage which serves as a read-and-write cache for storage resource 235a through storage resource 235n respectively. Cache 230a through cache 230n may retain data even when electrical power is lost such as from a power outage, a system crash, or from a normal system shutdown.

Storage resource 235a to storage resource 235n may include a system, device, or apparatus configured to store data. Storage resource 235a through storage resource 235n may include one or more HDDs, magnetic tape libraries, optical disk drives, magneto-optical disk drives, SSDs, compact disk drives, compact disk arrays, disk array controllers, and/or any other systems, apparatuses or devices configured to store data. In certain embodiments, storage resource 235a through storage resource 235n may be in one or more storage enclosures configured to hold and/or power one or more of such storage resources. In another embodiment, storage resource 235a may reside external to storage server 220a such as coupled to storage server 220a via a network or a wired connection. Storage server 220a may also be referred to as a managed node and volatile storage 225a, cache 230a and storage resource 235a may collectively be referred to as managed node storage.

Uninterruptible power system 240 provides emergency power to one or more storage servers or one or more storage systems when the main power source fails. This allows for the safe and orderly shutdown of an information handling system. The size and design of UPS 250 in addition to the charge level of battery 255 may determine how long uninterruptible power system 240, UPS 250, or battery 255 may supply power. UPS 250 may be given a power rating in volt-amperes (VA) with a range from 300 VA to 5,000 kVA. This allows the data in the volatile storage to be moved to the cache before the battery runs out of power. When the battery runs out of power, the data remaining in the volatile storage will be erased. However, data that have been moved to the cache will not be lost.

Storage system administrative console 260 may be communicatively coupled to data management system 205 and may comprise any instrumentality or aggregation of instrumentalities by which a user may interact with data management system 205. For example, storage system administrative console 260 may permit a user to input data and/or instructions such as update a data management policy via a display device. In addition to managing storage system 215, storage system administrative console 260 may be used to manage data management policies. Data management policies may be stored in data repository 210.

Data management system 205 may be configured to manage and monitor storage system 215 over a period of time. This includes preventing or minimizing data loss in case of a power failure also referred to as a power outage. Data management system 205 may operate in two phases: a data collection phase and a data inference phase. The two phases may also be referred to as a learning phase. In a data collection phase also referred to as a telemetry collection phase, data management system 205 may obtain data associated with the inventory and health of storage resources, volatile storages, caches, and other devices or components associated with storage system 215. The data may be obtained by collection and/or receipt of the information from the various devices and/or components of storage system 215 via a BMC or a service processor.

Data management system 205 may collect information associated with the size of data and frequency of data movement in volatile storages, the caches, the storage resources of storage system 215. For example, data management system 205 may collect information regarding the size of data in volatile storage 225a and cache 230a. Data management system 205 may also collect information regarding the frequency of data movement between volatile storage 225a to cache 230a and from cache 230a to storage resource 235a.

Data management system 205 may collect node, cluster, and rack association matrix of storage system 215 such as via one or more mechanisms such as a hardware controller. Data management system 205 may also collect information that may be used to identify which uninterruptible power system manages a particular storage system, node, or cluster. In this example, uninterruptible power system 240 may be configured to manage storage system 215. Data management system 205 may monitor the health of uninterruptible power system 240 and battery 255 such as via UPS manager 245. Data management system 205 may collect information associated with UPS 250 such as the current power and voltage of UPS 250 and compare it with the vendor power rating and voltage rating of UPS 250. Data management system 205 may also collect information associated with battery 255 such as charge level, temperature, discharge level, etc.

The collection may be performed periodically such as hourly, daily, weekly, etc. Different information may be collected at different periods or intervals. For example, data associated with the health of the volatile storages, the caches, and/or storage resources may be collected hourly. However, an inventory of the storage resources may be performed weekly. Collection may also be triggered by an event or an action. For example, the charge level of battery 255 may be collected when a power outage is detected. Instead of collecting information associated with the health of the volatile storages, the caches, and the storage servers, the aforementioned may transmit data to data management system 205 periodically or when triggered by an event and/or action. The historical information from storage system 215 an uninterruptible power system 240 may be stored in data repository 210.

During the data inference phase also referred to as the telemetry phase, data management system 205 may use the obtained data in the data collection phase to learn various information associated with storage system 215 such as data usage to avoid or minimize data loss. Data management system 205 may also determine other health indicators such as length of time that UPS 250 is active, average load on UPS 250 during a power outage, temperature changes, battery charge and discharge level of battery 255, etc.

Data management system 205 may determine the power requirements of each of the storage servers in storage system 215. For example, data management system 205 may determine historical information associated with high, low, or average power requirements of each of the storage servers. In another example, data management system 205 may determine the power requirement and time needed to move data from volatile storage 225a to cache 230a. Data management system 205 may use this information to adjust the size of data stored in volatile storage 225a and frequency of data movement from volatile storage 225 to cache 230a during an event such as a power outage.

Figure 4:
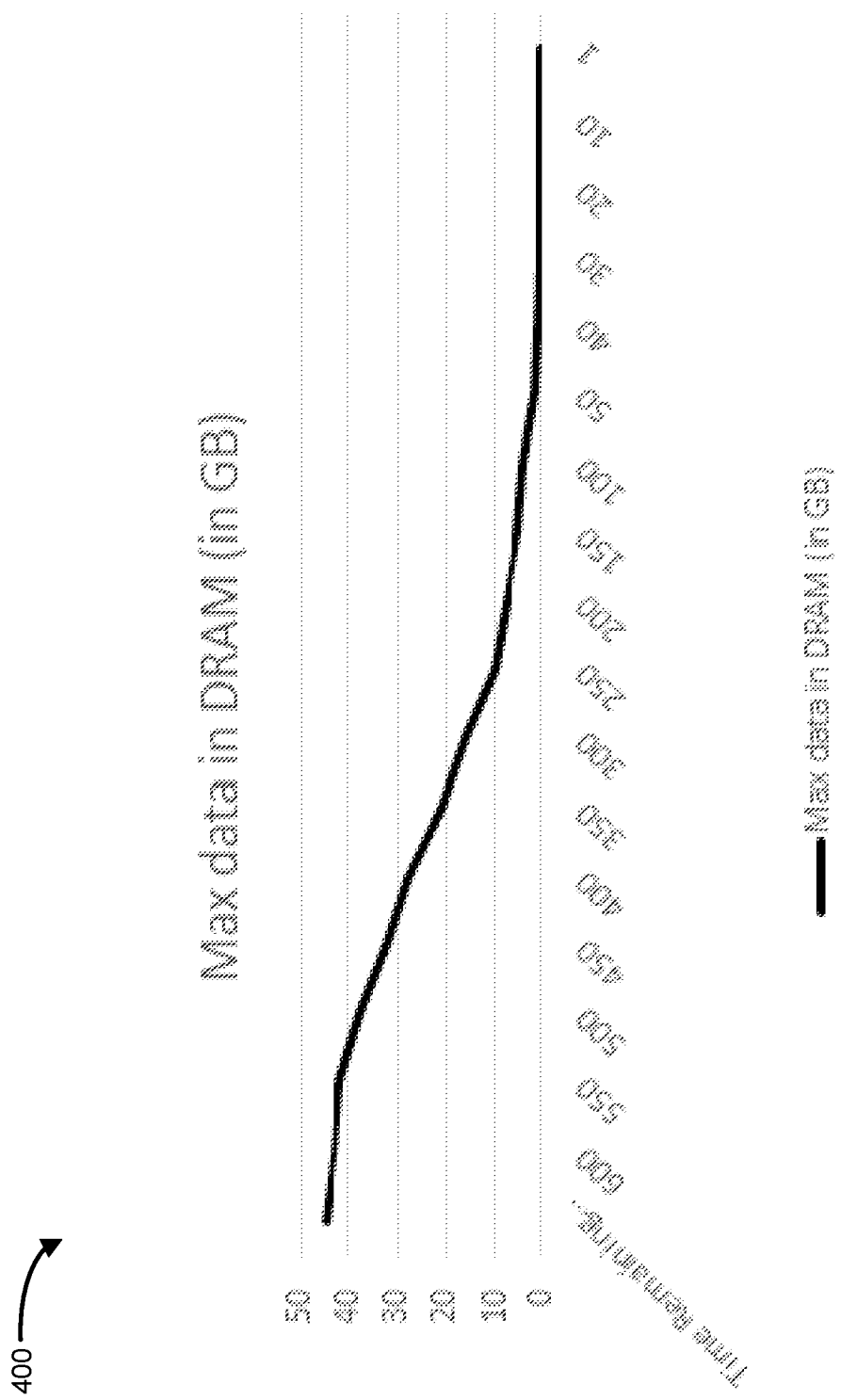
FIG. 4 is a table illustrating an example of a mapping of the power consumed and/or time taken by the storage server to move data from the volatile storage device to the cache.

Based on collected information, data management system 205 may determine that UPS 250 may supply storage server 220a with 1-kilowatt power for 1 hour or 2 kilowatts for 0.5 hours. Data management system 205 may also determine that UPS 250 may supply storage server 220a and storage server 220b with 1-kilowatt power for 0.5 hours or 2 kilowatts for 0.25 hours. In addition, data management system 205 may generate a mapping of the power consumed and/or time taken by the storage server to move data from the volatile storage device to the cache with various transfer data sizes also referred to as cache update sizes for each node or each cluster as shown in table 400 of FIG. 4. The collected historical data and generated mapping may be stored in data repository 210.

Based on the insight gained during the inference phase, data management system 205 may apply a policy setting at a node or cluster level when a trigger such as a power outage is detected. When one or more storage server 220a to storage server 220n of storage system 215 transitions to the safe mode, an event may be transmitted to data management system 205 which may trigger data management system 205 to determine and apply one or more data management policies also referred to as data protection policies to be applied to the storage system in the safe mode. The policy-setting may determine the data movement interval or frequency and data size to be moved from the volatile storage to the cache. The policy-setting may also determine the size of the data stored in volatile storage and the size of data to be maintained in volatile storage 225a. Data management system 205 may adjust the size of the data in each of the volatile storages and the frequency of the data movement from the volatile storage to the corresponding non-volatile storage based on the collected historical data. For example, the frequency of data movement and the size of the data in the volatile storage may be increased and/or decreased to determine the optimal size and frequency based on the power availability of UPS 250 and the charge level of battery 255.

One or more storage servers in storage system 215 may operate in either a normal mode or in a safe mode. The storage server may operate in a safe mode during power outage. During normal operation data movement and size of data in the volatile storage are not adjusted by data management system 205. When a triggering event is detected by data management system 205, the aforementioned may determine a data management policy to be applied to a node, a storage server, or a cluster of storage servers. A particular data management policy may be applied to one storage server and another data management policy may be applied to a second storage server. For example, a policy 265 may be applied to storage server 220a and storage server 220b while a policy 270 may be applied to storage server n.

Data management system 205 may have cluster level policy settings which can determine the data movement interval and size from RAM to the cache. Data management system 205 may communicate the policy to the cluster manager to influence the data movement interval and size. If storage system 215 is operating in a normal mode, the data movement interval is not influenced by data management system 205. If storage system 215 is operating in a safe mode, then the data management policies may be based on several scenarios that include the following: a) first scenario: the UPS is healthy or the battery is fully charged but the capacity of the UPS or the battery is not enough to support the size of the data in the volatile storage b) second scenario: the UPS and the battery are healthy but the battery is not fully charged c) third scenario: the UPS or the battery is degrading or becoming unhealthy d) fourth scenario: the UPS or battery is healthy but the cache is unhealthy and e) fifth scenario: the UPS or the battery is degrading but the cache is unhealthy.

The "healthy" and "unhealthy" state of UPS 250, the battery, the volatile storage, the cache, and the storage resource may be predetermined thresholds that may be stored in a setting in data management system 205. The size of the data in the volatile storage device may be deemed "safe" or "unsafe" based on predetermined thresholds or factors that may be stored in a setting in data management system 205. These predetermined thresholds may have been calculated based on the collected historical data. A typical estimated maximum data size that can be safely maintained in the volatile storage device such as volatile storage 225a may be equal to ((UPS efficiency*UPS capacity)/current total workload)*storage resource transfer rate). The storage resource transfer rate includes retries. If the size of the data in the volatile storage is equal or less the maximum data size, then the size of data in the volatile storage may be deemed safe. If the size of the data in the volatile storage is greater than the maximum data size, then the size of the data in the volatile storage may be deemed unsafe. The aforementioned calculation is a continuous process. In addition, if the actual size of the data in the volatile storage device reached a threshold, then frequency of data movement is derived which may be inversely proportional to the size of the volatile storage device.

If UPS 250 is healthy or the battery charge level is high but the capacity and/or the runtime also referred to as the hold-up time is below the threshold to safely move the maximum data size from the volatile storage device to a non-volatile storage device, then an alert may be generated to indicate an insufficient hold-up time also referred to as hold time. The "low" and "high" battery charge levels may be predetermined thresholds that may be stored in a setting in data management system 205. The hold-up time is the amount of time that UPS can supply power to the storage server. For example, if the current total load is 250 watts, then a UPS with a capacity rating of 2700 may provide around 72 minutes of runtime if fully charged.

If UPS 250 and battery 255 are healthy but battery 255 is not fully charged, then data management system 205 may determine a data management policy to be applied. A calculation of the transfer data size, frequency of data transfer may be based on the size of the data in the volatile storage, UPS 250 capacity, and battery 255 runtime. Rules may be generated based on the determined data management policy and the aforementioned calculations.

If the health of UPS 250 and battery 255 is degrading, then data management system 205 may determine a data management policy to be applied to a storage server or a cluster of storage servers. Data management system 205 may determine the frequency and transfer data size of moving data from volatile storage to the cache based on the probable battery runtime. The data transfer frequency may be higher with minimal transfer data size in comparison with the data transfer frequency and transfer data size of a healthy UPS and battery. The data management policy may also be based on the associativity of UPS-cluster nodes and the type of workload that would be running on the cluster of storage servers as the health degradation of the cache layer may be correlated to the type of workload.

If UPS 250 is healthy or battery 255 is healthy but the cache is unhealthy, then data management system 205 may account for uncorrectable memory blocks of the cache in addition to accounting for the first scenario in determining the data management policy. If the health of UPS 250 or battery 255 is degrading and the cache is unhealthy, data management system 205 may account for uncorrectable memory blocks of the cache in addition to accounting for the third scenario in determining the data management policy. After determining the data management policy to be applied to the node based on one or more scenarios, storage server, the cluster, or a set of storage servers, data management system 205 may communicate the data management policy to storage system administrative console 260 to influence the transfer data size and transfer frequency.

FIG. 2 is annotated with a series of letters A-F. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, data management system 205 may collect inventory data from a management controller of storage system 215 and/or storage server 220a through storage server 220n. The inventory data may include information associated with the volatile storage, the cache, and the storage resource of each of the storage servers. At stage B, data management system 205 may collect information associated with UPS to the node, cluster, and/or rack association matrix. At stage C, data management system 205 may periodically obtain storage system 215 metrics such as size of data maintained in the volatile storage and frequency of data movement from the volatile storage to the cache such as frequency of data movement from volatile storage 225a to cache 230a. At stage D, data management system 205 may collect historical information associated with uninterruptible power system 240 such as the health of UPS 250, current load of UPS 250, the health of battery 255, charge level of battery 255, remaining time of UPS 250 availability, etc. At stage E, data management system 205 may determine a data movement pattern using historical data. In particular, data management system may create a mapping of the power consumed vs. the maximum data size in the volatile storage and vs. the update frequency from the volatile storage to the cache. The data movement pattern may be used as a basis in determining the current data movement calculations such as the optimal size and frequency of data movement in addition to the maximum data size in the volatile storage. The data movement pattern may also be used to determine the thresholds.

At stage F, data management system 205 may listen for alerts from one or more components of uninterruptible power system 240 such as UPS manager 245, UPS 250, and battery 255. The uninterruptible power system 240 may transmit an alert in various instances such as when there is a power outage, battery 255 cannot sustain the requirements of storage system 215, battery 255 needs to be replaced, etc. The alerts may be configured via UPS manager 245. When an alert associated with a power outage is detected, data management system 205 determines a proactive solution that is based on the collected historical data to prevent or minimize data loss of storage system 215. The historical data may include the health of UPS 250 over a period of time, charge and discharge level of battery 255, how long UPS 240 has been active, the average load of UPS 250 during the normal mode of operation of the storage server the average load of UPS 250 during the safe mode of operation of the storage server, etc.

The solution may include determining the capacity of battery 255 and health of UPS 250. Based on one or more factors, such as the capacity of battery and 255, health of UPS 250, health of battery 255, and health of the non-volatile storage, data management system 205 may determine an optimal frequency and size of data movement from the volatile storage to the non-volatile storage. The optimal transfer frequency and size of data to be moved from the volatile storage also referred to as transfer data size, may be based on whether the storage server is in a normal mode or safe mode. In one example, if battery 255 is at full capacity which means that the interval to move data from volatile storage 225a to cache 230 for example maybe longer, that is data movement is less frequent. If battery 255 is at 50%, then the interval to move data from volatile storage 225a to cache 230a may be shorter, that is data movement is more frequent. In addition, to the optimal transfer data size, the data management system 205 may also determine the maximum transfer data size and the minimum transfer data size. Also, data management system 205 may determine the maximum transfer frequency interval and the minimum frequency interval in addition to the optimal transfer frequency interval.

Figure 3:
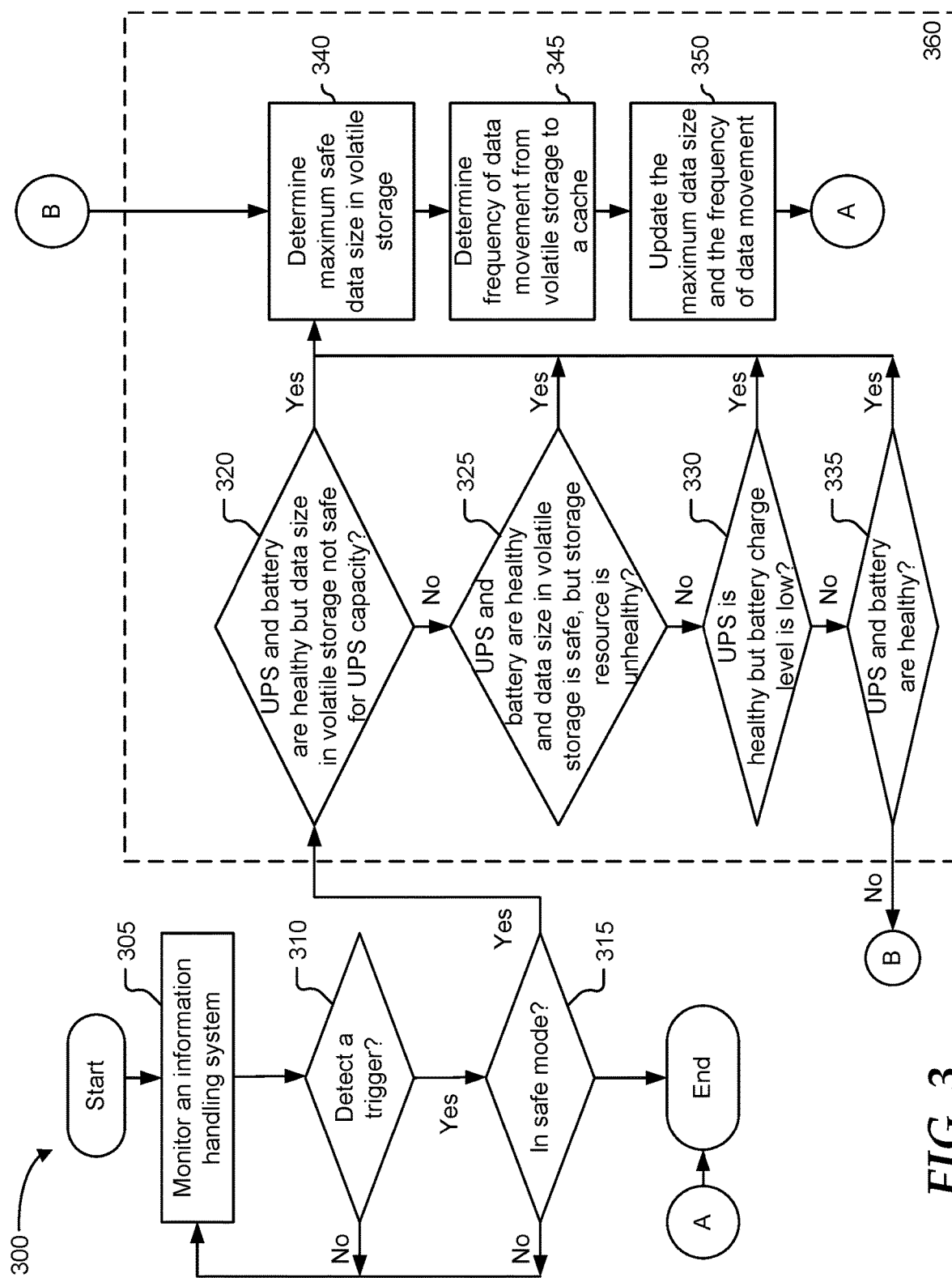
FIG. 3 is a flowchart illustrating an example of a method for data loss protection during power loss of a storage system, according to an embodiment of the present disclosure.

FIG. 3 shows a method 300 for data loss protection during power loss of a storage system. While embodiments of the present disclosure are described in terms of data management system 205 of FIG. 2, it should be recognized that other systems may be utilized to perform the described method. Method 300 illustrates how the data management system may use the collected data and generate an inference on the data movement from a volatile storage device to a cache based on the health or state of the UPS, the charge level of the battery, the health of the battery, and the health of the cache. The method may synchronize the transfer data size and transfer frequency with the health of the UPS and/or the battery. Data management system 205 may also determine the maximum size of data that can be stored in the volatile storage device before or during the power outage or power failure. The maximum data size that can be stored in the volatile storage device may be based on whether the storage server is in a normal mode or safe mode.

Method 300 typically starts at block 305 where the method monitors an information handling system such as a storage server to detect a trigger. At this time, the information handling system may be in the normal mode of operation. During the normal mode operation such as when adequate power is provided by a primary power supply unit to storage server, data may be written to volatile storage prior to storing stored in a cache and then to a storage device. For example, data may be stored in volatile storage 225*a* before being stored in cache 230*a* and then to storage resource 235*a*.

The trigger may be an event such as a power outage or a time-based event. For example, information indicating that the main power supply of the information handling system has been shutdown. The method proceeds to decision block 310, where the method determines whether it detects a trigger such as a power loss or outage warning, wherein a power loss is imminent or has happened. If the method detects a trigger, then the "YES" branch is taken, and the method proceeds to decision block 315. If the method does not detect a trigger, then the "NO" branch is taken, and the method loops back to block 305.

At decision block 315, the method determines whether the information handling system is in a safe mode. If the information handling system is in the safe mode, then the "YES" branch is taken, and the method proceeds to decision block 320. If the information handling system is not in the safe mode, then the "NO" branch is taken, and the method proceeds to block 305. If the information handling system is in the safe mode, the method may determine a data management policy to be applied to the information handling system based on the current scenario. Decision block 320, decision block 325, decision block 330, and decision block 335 may be included in a block 360 that determines the data management policy. Block 360 may include more or less decision blocks in determining the data management policy. The decision blocks in block 360 may be based on one or more scenarios depicted above.

At decision block 320, the method determines whether the UPS or the battery charge level is high but the size of the data in the volatile storage is not safe based on the capacity of the UPS or the battery charge level. In particular, the size of the data in the volatile storage is greater than the size of data that can be transferred to the cache within battery charge level and the current capacity and runtime of the UPS. If the method determines that the UPS and its battery are healthy but the data size in the volatile storage is not safe for the UPS capacity, then the "YES" branch is taken, and the method proceeds to block 340. If the method determines that UPS and its battery are healthy but the data size in the volatile storage is safe for the UPS capacity, then the "NO" branch is taken, and the method proceeds to decision block 325.

At decision block 325, the method determines whether the UPS and battery are healthy and the size of the data in the volatile storage is safe based on the UPS capacity but the storage resource of the information handling system is not healthy. If the method determines that the UPS and battery are healthy and that their capacity and available runtime are enough to move the data in the volatile storage to the cache but the storage resource of the information handling system is not healthy, then the "YES" branch is taken and the method proceeds to block 340. If the method determines that the UPS and battery are healthy and that their capacity and available runtime are enough to move the data in the volatile storage to the cache but the storage resource of the information handling system is healthy, then the "NO" branch is taken and the method proceeds to decision block 330.

At decision block 330, the method determines whether the UPS is healthy, but the battery charge level is low. If the method determines that the UPS healthy and the battery charge level is low, then the "YES" branch is taken, and the method proceeds to block 340. If the method determines that the UPS is healthy, but the battery charge level is not low then the "NO" branch is taken, and the method proceeds to decision block 335. At decision block 335, the method determines if the UPS and the battery are healthy. If the method determines that the UPS and the battery are healthy, then the "YES" branch is taken, and the method proceeds to block 340. If the method determines that the UPS and the battery are not healthy, then the "NO" branch is taken, and the method proceeds to block 340.

At block 340, the method may determine the maximum data size that may be stored safely in the volatile storage device. In particular, this may be the maximum data size that may be stored in the volatile storage device that can be moved to the cache, which is non-volatile storage, within the constraints of the UPS capacity and runtime. The method proceeds to block 345 where the method may determine the frequency of data movement from the volatile storage device to the cache. The frequency of data movement may be determined within the constraints of the battery charge level and/or the UPS capacity and runtime.

The method proceeds to block 350 where the method may update one or more parameters in the storage system such as the maximum data size and the frequency of data movement based on block 340 and block 345. For example, the method may update the parameters via a storage system management console similar to storage system administrative console 260 of FIG. 2. The storage system management console may be configured to manage the movement of data between the volatile storage, the cache, and the storage resource of the storage server. Update the update, the storage system management console may then manage the data movement in the volatile storage, the cache, and the storage resource based on the updated parameters such as the maximum data size, transfer data size, and frequency of data movement. After the update, the method ends.

Although FIG. 3 show example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 340 and block 345 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   in response to detecting an event, determining a data management policy to be applied to an information handling system;
   calculating a data transfer frequency and data transfer size of data from a volatile storage device to a non-volatile storage device; and
   transferring the data from the volatile storage device to the non-volatile storage device based on the data transfer frequency and the data transfer size to prevent data loss, wherein the data management policy is based on a plurality of scenarios that includes whether an uninterruptible power supply is healthy and a charge level of a battery is high, and wherein one scenario of the scenarios includes when the uninterruptible power supply is healthy and the non-volatile storage device is unhealthy.

2. The method of claim 1, obtaining data associated with the uninterruptible power supply and the battery associated with the uninterruptible power supply.

3. The method of claim 2, wherein the data associated with the uninterruptible power supply and the battery associated with the uninterruptible power supply includes length of time the uninterruptible power supply has been active, health of the uninterruptible power supply, health of the battery, and average load of the uninterruptible power supply during a power outage.

4. The method of claim 1, further comprising calculating a maximum size of data that can be stored in the volatile storage device that can be safely moved to the non-volatile storage device during a power outage.

5. The method of claim 4, determining whether the data in the volatile storage device is inferred safe based on the data management policy, wherein the data in the volatile storage device is inferred safe when size of the data is equal to or less than the maximum size of the data that can be safely moved to the non-volatile storage device during the power outage.

6. The method of claim 1, wherein the data management policy is when the information handling system is in a safe mode.

7. The method of claim 1, wherein another scenario of the scenarios includes when a hold-up time below a threshold to safely move the data from the non-volatile storage device, generating an alert to indicate insufficient uninterruptible power supply hold-up time.

8. The method of claim 1, wherein another scenario of the scenarios includes when the uninterruptible power supply is healthy but the charge level of the battery associated with the uninterruptible power supply is low.

9. The method of claim 1, wherein another scenario of the scenarios includes when the uninterruptible power supply is unhealthy.

10. The method of claim 1, wherein another scenario of the scenarios includes when the uninterruptible power supply and the battery are healthy.

11. The method of claim 1, further comprising accounting for uncorrectable memory blocks.

12. The method of claim 1, wherein another scenario of the scenarios includes when the uninterruptible power supply is unhealthy and the non-volatile storage device is unhealthy.

13. The method of claim 1, further comprising generating a mapping of power consumed by the information handling system to the transfer data size from the volatile storage device to the non-volatile storage device.

14. The method of claim 1, further comprising generating a mapping of time taken by the information handling system to transfer the transfer data size from the volatile storage device to the non-volatile storage device.

15. An information handling system, comprising:
   a processor; and
   a memory storing code that when executed causes the processor to perform operations, the operations including:
      in response to detecting an event, determining a data management policy to be applied to the information handling system;
      calculating a data transfer frequency and a data transfer size of data from a volatile storage device to a non-volatile storage device; and
      transferring the data from the volatile storage device to the non-volatile storage device based on the data transfer frequency and the data transfer size to prevent data loss, wherein the data management policy is based on a plurality of scenarios that includes whether an uninterruptible power supply is healthy and a charge level of a battery is high, and wherein one scenario of the scenarios includes when the uninterruptible power supply is healthy and the non-volatile storage device is unhealthy.

16. The information handling system of claim 15, wherein the processor is configured to monitor the information handling system.

17. The information handling system of claim 15, wherein the processor is configured to monitor the uninterruptible power supply.

18. A non-transitory computer readable medium storing instructions that when executed implements a method, the method comprising:

in response to detecting an event, determining a data management policy to be applied to an information handling system;

calculating a data transfer frequency and a transfer data size from a volatile storage device to a non-volatile storage device based on the data management policy, wherein the calculating the data transfer frequency and the data transfer size is further based on health of the non-volatile storage device, and wherein the non-volatile storage device functions as a cache tier of the information handling system;

and transferring data from the volatile storage device to the non-volatile storage device based on the data transfer frequency and the data transfer size.

19. The method of claim 18, further comprising monitoring an uninterruptible power supply to listen for an alert from the uninterruptible power supply.

20. The method of claim 18, wherein the data management policy is to be applied when the information handling system is in a safe mode.

* * * * *